United States Patent
Kim et al.

(10) Patent No.: US 6,492,467 B1
(45) Date of Patent: Dec. 10, 2002

(54) PROCESS FOR MAKING ABS POLYMERIC BLENDS

(75) Inventors: Joong-In Kim, Amherst, MA (US); Wan Chu Wu, Longmeadow, MA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/852,103

(22) Filed: May 9, 2001

(51) Int. Cl.[7] .................. C08F 279/02; C08F 279/04
(52) U.S. Cl. ............................. 525/316; 525/71
(58) Field of Search .................. 525/316, 71

(56) References Cited

U.S. PATENT DOCUMENTS

| | | | |
|---|---|---|---|
| 3,243,481 A | 3/1966 | Ruffing et al. | 260/880 |
| 3,509,237 A | 4/1970 | Aubrey | 260/876 |
| 3,658,946 A | 4/1972 | Bronstert et al. | 260/878 R |
| 3,903,199 A | 9/1975 | Dalton | 260/876 R |

Primary Examiner—Nathan M. Nutter
Assistant Examiner—Olga Asinovsky
(74) Attorney, Agent, or Firm—Joseph C. Gil; Aron Preis

(57) ABSTRACT

A process for the preparation of a blend of ABS polymers is disclosed. The invention comprises introducing a core/shell grafted rubber in the form of powder (crumb) to at least one stage of the continuous mass polymerization process for making an ABS polymer. Accordingly, the process comprises, in sequence, steps (i) through (iii) wherein (i) refers to charging into a first reactor a material system containing primarily monoalkenylaromatic monomer and an ethylenically unsaturated nitrile monomer having dissolved therein diene rubber under conditions to promote at least partial polymerization to form a partially polymerized first mixture and where (ii) refers to polymerizing the first mixture in a subsequent reactor to form a subsequent mixture and where (iii) refers to devolatilizing the subsequent mixture, and introducing said core/shell grafted rubber into at least one of step (i), (ii) and (iii) to yield a blend having a dispersed grafted rubber phase with a bimodal or multimodal particle size distribution.

35 Claims, No Drawings

PROCESS FOR MAKING ABS POLYMERIC BLENDS

FIELD OF THE INVENTION

This invention relates to a process for preparing blends of ABS polymers; more particularly, the process relates to the continuous mass polymerization of ABS polymers.

SUMMARY OF THE INVENTION

A process for the preparation of a blend of ABS polymers is disclosed. The invention comprises introducing a core/shell grafted rubber in the form of powder (crumb) to at least one stage of the continuous mass polymerization process for making an ABS polymer. Accordingly, the process comprises, in sequence, steps (i) through (iii) wherein (i) refers to charging into a first reactor a material system containing primarily monoalkenylaromatic monomer and an ethylenically unsaturated nitrile monomer having dissolved therein diene rubber under conditions to promote at least partial polymerization to form a partially polymerized first mixture and where (ii) refers to polymerizing the first mixture in a subsequent reactor to form a subsequent mixture and where (iii) refers to devolatilizing the subsequent mixture, and introducing said core/shell grafted rubber into at least one of step (i), (ii) and (iii) to yield a blend having a dispersed grafted rubber phase with a bimodal or multimodal particle size distribution.

BACKGROUND OF THE INVENTION

Polyblends, that is blends of rubber grafted with styrene/acrylonitrile polymers represent a family of thermoplastic molding compositions having excellent mechanical properties, most notably, resistance to impact. The conventional process to make polyblends of ABS (acrylonitrile-butadiene-styrene) may entail compounding of an emulsion-made intermediate having high rubber content (50–60%) with pellets of styrene/acrylonitrile copolymer (SAN) and/or with continuous mass-made intermediates having a lower rubber content (less than 15%). The continuous mass (CM) process is economical, yet, the product thus produced is limited in terms of its properties due to limitations on the rubber content. For example, low gloss extruded products have large rubber particle size and relatively low rubber content resulting in relatively lower impact strength. Compounding of CM-product with small amounts of emulsion-produced intermediate increases the impact strength but entails an additional process step, which makes the process less desirable.

Various processes for the manufacture of such polyblends, including emulsion., suspension and mass polymerization techniques, and combinations thereof have been reported. Such polyblends of monoalkenyl aromatic and ethylenically unsaturated nitrile monomers and grafted rubber that are prepared in the mass polymerization process exhibit desirable properties, yet, this technique has a practical limitation upon the maximum degree of conversion of monomers to polymer. Techniques have, therefore, been adopted where initial mass polymerization is carried out to a point of conversion beyond phase inversion where the viscosity is still of practical magnitudes, and the resulting pre-polymerized syrup is suspended in water or other inert liquid and polymerization of the monomers is continued. U.S. Pat. No. 3,509,237 disclosed a mass/suspension method of polymerization styrene/acrylo-nitrile having diene rubbers dissolved therein with the rubber being grafted, inverted and dispersed as rubber particles under agitation. After phase inversion, the viscous mixture is suspended in water and polymerization is completed producing a polyblend in the form of beads. Such mass/suspension processes have the shortcomings of batch operations. U.S. Pat. No. 3,243,481 disclosed a process in which diene rubbers are dissolved in predominantly monovinylidene aromatic monomers and polymerized in four reaction zones. Such processes require physically separated reactors providing different reacting conditions for each step of polymerization involving costly multiple reactors and specialized equipment. U.S. Pat. No. 3,658,946 disclosed a process wherein the prepolymerization is run to a solids content of no more than 16% to provide a rubber particle having a particular structure. U.S. Pat. No. 3,751,526 disclosed a process for producing rubber modified thermoplastic resins by extracting a grafted diene rubber from a latex into a styrene-acrylonitrile monomer phase, separating the monomer-rubber phase from the water phase and mass polymerizing the monomer-rubber phase to provide a polyblend of styrene/acrylonitrile polymer and a single grafted rubber phase. The process disclosed in U.S. Pat. No. 3,509,237 refers to the preparation of styrene/acrylonitrile/rubber polyblends having a first and second grafted rubber phase wherein the first grafted rubber has a large particle size and the second grafted rubber has a smaller particle size. Such polyblends have superior properties if the smaller particle size rubber phase constitutes the largest proportion of the total rubber phase. A process for making such polyblends is disclosed wherein the two grafted rubber polyblends are prepared in batch processes separately and, thereafter, melt blended mechanically to form a polyblend having a first and second grafted rubber phase. U.S. Pat. No. 3,903,199 disclosed a relevant continuous mass polymerization process for preparing a polymeric polyblend. The process entails polymerizing monomers containing 0.1 to 15% by weight of a soluble diene rubber so as to convert 10 to 40% of the monomers to a polymer. A portion of the polymer is grafted on the diene rubber and dispersed as a first grafted diene rubber in a monomer-polymer phase to provide a partially polymerized mixture. This grafted diene rubber is dispersed as rubber-monomer particles having an average particle size of 0.7 to 10 microns and having present occluded and grafted polymer. The process further entails continuous withdrawal of this partially polymerized mixture and continuous polymerizing of this mixture until the polymerization has reached a conversion of about 25 to 80%. A second grafted crosslinked diene rubber is continuously being dispersing in the polymerized mixture.

The present invention is predicated on the findings that a particularly structured, emulsion-produced grafted rubber, namely a core/shell-structured grafted ABS may be added directly to the CM process resulting in a polyblend having improved properties.

DETAILED DESCRIPTION OF THE INVENTION

The invention is predicated on the finding that a polyblend having desirable mechanical properties may be prepared by a hybrid process that incorporates a particular product that is produced by emulsion polymerization (the products is herein sometimes referred to as "crumb") as a component in the continuous mass polymerization process. The morphology of the crumb, the core/shell structure of the rubber particles was found to be a key parameter for making the necessary stable dispersion of rubber in a system containing monomers and/or solvent. The rubber content of the crumb needs to be sufficiently high and the CM product needs to be the dominant component in the resulting polyblend.

Accordingly, the process comprises introducing a emulsion polymerization produced core/shell grafted diene rubber to at least one stage of the continuous mass polymerization process for making an ABS polymer. Comprising in sequence, steps (i) through (iii) wherein (i) refers to charging into a first reactor a material system containing primarily monoalkenylaromatic monomer and an ethylenically unsaturated nitrile monomer having dissolved therein diene rubber under conditions to promote at least partial polymerization to form a partially polymerized first mixture and where (ii) refers to polymerizing the first mixture in a subsequent reactor to form a subsequent mixture and where (iii) refers to devolatilizing the subsequent mixture, and introducing said core/shell grafted rubber into at least one of step (i), (ii) and (iii) to yield a blend having a dispersed grafted rubber phase with a bimodal or multimodal particle size distribution.

Specifically, in step (i) a continuous mass polymerization process of monomers containing 5 to 20% by weight of a soluble diene rubber is carried out so as to convert 10 to 40% of these monomers to a polymer, to graft at least a portion of the polymer on the diene rubber and to disperse the rubber as a first grafted diene rubber in a monomer-polymer phase, to provide a first partially polymerized mixture. The monomers used in step (i) comprise predominantly monoalkenylaromatic monomer and an ethylenically unsaturated nitrile monomer. The diene rubber being dispersed as rubber particles have an average particle size of 0.2 to 10 microns. In step (ii), the first partially polymerized mixture of (i) is polymerized in a continuous mass process in a subsequent reactor until the polymerization has reached a conversion of about 40 to 80% to provide a second partially polymerized mixture. In step (iii), the product discharged of the subsequent reactor is continuously devolatilized to provide a polymeric polyblend.

The introduction of a core/shell grafted rubber in accordance with the invention may be made into at least one of steps (i), (ii) and (iii) is continuous.

The charge into the first reactor contains predominantly monoalkenylaromatic monomer and a lesser amount of an ethylenically unsaturated nitrile monomer (herein "Formulation A"). Examples of suitable monoalkenylaromatic monomer include styrene; alpha-alkyl monovinylidene monoaromatic compounds, e.g., alpha-methylstyrene, alpha-ethylstyrene, alpha-methylvinyltoluene, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed. Examples of the unsaturated nitriles which may be used are acrylonitrile, methacrylonitrile, ethacrylonitrile, and mixtures thereof. Examples of the additional monomers which may be interpolymerized with the monoalkenylaromatics and unsaturated nitriles are conjugated 1,3-dienes, e.g., butadiene, isoprene, etc.; alpha- or beta-unsaturated mono-basic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. The amount of these additional comonomers which may be included may vary and is generally about 0 to 10, preferably 1 to 5, percent relative to the weight of the total monomer charge.

The polymerizable monomer mixtures contain at least 20, preferably at least 50 percent by weight of the monoalkenylaromatic monomer and at least 5, preferably at least 10, percent by weight of the unsaturated nitrile. A preferred formulation contains 20 to 95, preferably 60 to 85 percent by weight of the vinylidene aromatic hydrocarbon and 80 to 5, preferably 40 to 15, percent by weight of the unsaturated nitrile. In addition to the monomers to be polymerized, the formulation may contain catalyst and other desirable components such as stabilizers, molecular weight regulators, etc., in functional amounts and for their art-recognized utility.

The polymerization may be initiated by thermal monomeric free radicals, however, any free radical generating catalyst may be used in the practice of this invention. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyldiperphthalate, tert-butyl peracetate, tert-butyl perbenzoate, dicumyl peroxide, tert-butyl peroxide isopropyl carbonate, 2,5-dimethyl-2,5-di(tert-butylperoxy)hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The amount of catalyst is generally about 0.001 to 3.0, preferably 0.005 to 1.0, percent by weight relative to the weight of the polymerizable material.

As is well known, it is often desirable to incorporate molecular weight regulators such as mercaptans, halides and terpenes in amounts of 0.001 to 1.0 percent by weight of the polymerizable material. From 2 to 20% diluents such as ethylbenzene, ethyltoluene, methyl ethyl ketone, ethylxylene, diethylbenzene or benzene may be added to the monomer composition to control viscosities at high conversions and also to provide some molecular weight regulation.

In addition, it may be desirable to include relatively small amounts of antioxidants or stabilizers such as the conventional alkylated phenol. These may be added during or after polymerization. The formulation may also contain other additives such as plasticizers, lubricants, colorants, and non-reactive preformed polymeric materials which are suitable or dispersible therein.

The preferred rubbers are diene rubbers, including mixtures of diene rubbers, i.e., any rubbery polymer (a rubbery polymer having a second order transition temperature not higher than 0° centigrade, preferably not higher than –20° C. as determined by ASTM Test D-746-52T) of one or more of the conjugated 1,3-dienes, e.g. butadiene, isoprene, 2-chloro-1,3 butadiene, 1 chloro-1,3 butadiene, piperylene, etc (herein "Rubber A"). Such rubbers include copolymers and block copolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.;

vinyl naphthalene, etc.); halomonovinylidene aromatic hydrocarbons (e.g., the o-, m- and p-chlorostyrene, 2,4-dibromostyrene, 2-methyl-4-chlorostyrene, etc.); acrylonitrile; methacrylonitrile; alkyl acrylates (e.g., methyl acrylate, butyl acrylate, 2-ethylhexylacrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and vinylidene chlorides and bromides, etc.); and the like.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about –50° C. to –105° C. as determined by ASTM Test D-746-52T. The diene rubber used in step (i) is a soluble diene rubber of the type described above. The stereospecific polybutadiene rubbers are the most preferred for optimum physical properties of the polyblend. A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

In carrying out the inventive process, a monomer formulation comprising predominantly a monoalkenyl aromatic monomer and an ethylenically unsaturated nitrile monomer having about 5 to 20% by weight of a diene rubber dissolved therein is charged continuously as a monomer-rubber solution to the first in a series of reactors. The monomers are polymerized at temperatures of about 70°–170° C. converting about 10–40% by weight of the monomers to a (co) polymer. At least a portion of this (co)polymer is grafted to the diene rubber as a grafted phase.

The amount of (co)polymeric grafted phase may vary from 10.0 to 250.0 parts by weight per 100.0 parts of graft base (substrate), the preferred graft copolymers will have a ratio of grafted phase to graft base of about 20:100 to 200:100 and most desirably about 30:100 to 150:100. With graft ratios of about 30 to 150:100, a highly desirable degree of improvement in various properties generally is obtained.

The particle size of the rubber is from about 0.2 to 10 microns preferably from 0.4 to 5 microns (particles size is in terms of weight average particle diameter). This size provides a desirable balance between the impact strength and the gloss of the polyblend. The impact strength was found to be influenced by the size and size distribution of the dispersed rubber particles.

The first grafted rubber particles are formed in step (i) and the second grafted rubber particles are added in step (i), (ii) or (iii) to yield a polyblend having a good balance of properties. Naturally, the added second graft may itself comprise a blend of grafts including grafts having particles the average sizes of which differ from the size of the first graft, thus yielding a polyblend having a bimodal or multimodal size distribution. Such blends may contain 1 to 50%, preferably 5 to 25% by weight of a second graft diene rubber particle, the percent being based on the weight of total rubber in the blend.

The second grafted rubber, an emulsion-polymerization product, is characterized in that its grafted substrate has a core/shell structure. The core is typically of crosslinked diene rubber of an average particle size of 0.15 to 0.6, preferably 0.3 to 0.5 microns and the shell enveloping the core is poly(styrene-co-acrylonitrile). The substrate is grafted with about 0.3 to 1 part of the monomers of "Formula A": 20–30% of unsaturated nitrites and 70–80% of monoalkenylaromatic monomer per 1 part of rubber substrate.

The second grafted rubber may be prepared by polymerizing monomers of Formula A in the presence of the preformed rubber substrate in accordance with conventional emulsion graft polymerization techniques. The preferred processes use an emulsion technique to obtain the particle size of not more than about 0.6 microns for the graft copolymer which is preferred for use in the practice of the present invention. In such graft polymerization, the monomers are charged into the preformed rubber particles dispersed in water and this admixture is polymerized to combine chemically or graft a portion of the monomers upon the rubber substrate. As is well known to the art-skilled, depending upon the ratio of monomers to rubber substrate and polymerization conditions, it is possible to regulate both the desired degrees of grafting of the monomers onto the rubber substrate and the polymerization of ungrafted matrix copolymer. Emulsion polymerization is preferred over mass or suspension polymerization for preparing the second grafted diene rubber since such will provide a narrow particle size distribution and core shell morphology which are key in the context of the present invention.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents, which have proven particularly advantageous, are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable in a manner well known in the art.

A polymerization catalyst may be included in an amount of 0.001 to 3.0, preferably 0.005 to 0.5, weight percent of the total polymerizable material. As is well known, it is often desirable to incorporate molecular weight regulators such as mercaptans, halides and terpenes in an amount of about 0.001 to 2.5 percent by weight of the polymerizable material. In addition, it may be desirable to include relatively functional amounts of antioxidants or stabilizers, such as the conventional alkylated phenols and the like, although these may be added during or after polymerization. The particle size of the rubber graft copolymer has a significant effect upon the gloss and physical properties of the product produced by the processes of this invention. Typically, the particle size of the second graft rubber copolymers used in the practice of the present invention may be about 0.15 to 0.6 microns, preferably 0.2 to 0.5 microns. A most preferred rubber graft copolymer for use in the practice of this invention are graft copolymers having a weight average particle size of from about 0.25 to 0.45 microns for the second grafted rubber. Preferably, the rubber used for the second grafted rubber is crosslinked. With respect to the graft copolymers, at least some degree of crosslinking is inherent during the graft polymerization process, and this desirably may be augmented through the addition of crosslinking agents or control of the polymerization conditions.

Dewatering, that is the separation of water, may be carried out by any convenient means including centrifuging, decanting, filtering, drying or the like. Preferably, for use in a continuous process, most of the water separation is carried out by a mechanical means which exerts pressure on the pasty or semisolid organic phase so as to separate the water most efficiently and completely. Generally, by such means, one is able to produce crumb that has less than 1% moisture.

The crumb, which is a loose agglomerate, or powder, of preferably crosslinked and grafted rubber particles, may be introduced at any of the stages of the inventive process. Optionally, the crumbs may be directly charged to the rubber dissolver that contains a diene rubber dissolved in monomers and solvents before being introduced to the first reactor. The crumb may also be introduced in the form of a stable dispersion in an inert solvent. Suitable solvents include nitrites such as acetonitrile, propionitrile, butyronitrile, methoxy propionitrile, benzonitrile, isobutyronitrile, acetone, cyanohydrin and the like, ketones such as acetone, methyl ethyl ketone, methyl propyl ketone, methyl isobutylketone, cyclohexanone and the like, lower carboxylic esters such as methyl acetate, ethyl acetate, butyl acetate, Cellosolve acetate, and the like, formamides and acetamides such as dimethylformamide, diethylformamide, dimethylacetamide, and the like. The preferred solvents are those selected from the nitrites and ketones. The amount of crumb in the solvent is 5 to 30, preferably 10 to 20 percent by weight relative to thew weight of the mixture. The preparation of a suitable dispersion follows conventional means and procedures that are well known in the art.

Optionally, the dispersion used for introducing the second graft may contain additional monomers.

The dispersion that contains the crumb may be dispersed by conventional methods such as continuously pumping into a transfer line for the first and/or subsequent reactor(s) or through a separate mixing vessel feeding directly to the devolatilization step.

The dispersion may be continuously subjected to one or more stages of devolatilization to remove the remaining unreacted monomers, saturated solvent and water. Such devolatilization is conducted in known manner in any desired devolatilizers. The devolatilization treatment is generally conducted at temperatures of from about 140° to 280° C. at reduced pressures of from 0.01 to 800 mmHg absolute, preferably at from about 180° to 250° C. and a pressure of from 2 to 200 mmHg abs. The product of the devolatilization stage is the polyblend composition substantially freed of free or unreacted monomer or monomers. Such free or residual monomer level is reduced to less than 1.0 percent by weight and desirably to less than 0.4 percent by weight.

After removal of the devolatilized polyblend from the devolatilization stage, generally in the form of a melt, it is formed into strands or other shapes by the use of stranding dies or other conventional means and thereafter cooled, cut or pelletized into the desired final size and stored or packaged for shipment. The final operations can all be conducted in a conventional manner through the use of known equipment and devices.

The present process, then, is useful in producing a wide range of ABS products with varying amounts of grafted rubber and matrix polymers having a wide range of monomer compositions. In addition, the polymerization steps provide the capability of producing matrix polymers having a wide range of average molecular weights and molecular weight distributions.

The following examples are set forth to illustrate more clearly the principles and practice of this invention to one skilled in the art. They are not intended to be restrictive but merely illustrative of the invention herein described.

EXAMPLES

1. Stability of Dispersions

Dispersions of several crumb products in methyl ethyl ketone (MEK) were prepared and their stability evaluated. Three crumb products described below were thus evaluated:

| Sample | Particle size[1] | Morphology | rubber content (%) | dispersion[3] | formation of coagulum[4] |
|---|---|---|---|---|---|
| 1 | 180 | hemisphere | 60 | ns | S |
| 2 | 180 | core/shell | 60 | st | L |
| 3 | 280/400[2] | core/shell | 58 | st | L |
| 4 | 280 | core/shell | 56 | st | L |

[1]particle size, in nanometers
[2]a mixture of particles of size 280 and 400 nm (1:1 ratio)
[3]st denotes "stable" dispersion, ns means "not stable"
[4]S denotes significant formation of coagulum, L denotes little formation of coagulum.

A mixture of MEK and crumb (10 percent by weight of crumb) was prepared, stirred and shaken for 1–2 hours. Stability was determined by visual inspection and based on the level of coagulum formed on the glass wall of the container. Sample 1 exhibited significant amount of coagulum; Sample 2 formed a stable dispersion, with small amount of coagulum on the glass wall. Samples 3 and 4 showed good stability with little amount of coagulum.

2. The stability of a dispersion of crumb of Sample 3 in a mixture of monomers and solvent was also determined. A mixture containing 60% styrene, 20% acrylonitrile and 20% MEK was prepared and crumb of Sample 3 in an amount of 5 percent relative to the weight of the mixture was added. The stability of the dispersion thus formed was checked visually. No noticeable coagulum was formed after 1–2 hours of shaking.

3. The experiment designated below as "Case 1" represents a comparative example where no crumb was introduced in the continuous mass process. The process was carried out following the procedure outlined below:

ABS polymer was prepared by a typical continuous mass as described below.

The preparation entailed using a system of two stirred reactors positioned in series. A feed stream continuously introduced to the first two-liter reactor at a rate of 800 gram/hour, had the following composition (percent by weight):

9.95% polybutadiene rubber, 48.6% styrene, 15.2% acrylonitrile 0.028% t-butyl peroxyneodecanoate 0.078% t-dodecyl mercaptan 26.1% methyl ethyl ketone The temperature in the first reactor was 82° C.

The reaction mixture was then continuously fed to the second two-liter reactor along with a separate, second feed stream, which was simultaneously and continuously fed thereto at a feed rate of 89 gram/hour. The second feed stream contained (percent by weight):

42.2% styrene
17.8% acrylonitrile
0.275% t-butyl ethylhexyl monoperoxy carbonate
0.22% t-dodecyl mercaptan
2.8% Irganox 1076
5.6% corn oil
31.1% methyl ethyl ketone The temperature in the second reactor was 147° C. The reaction mixture in the second reactor was reacted and then continuously fed to a one-staged devolatilizer at 240° C. and 10 mm Hg pressure to yield an ABS material.

In carrying out an experiment demonstrative of the invention-designated "Case 2" crumb (Mixture of 280 nm and 400 nm grated rubber particles at 1:1 ratio by weight) in the form of a dispersion in MEK—(10% crumb dispersion in MEK was introduced into the second reactor of the process described for carrying out "Case 1". Overall rubber content of the final product was 18.8% and 10% of total was emulsion crumb rubber and 90% was CM rubber.)

The product of Case 1 was evaluated in comparison to the polyblend of "Case 2" and the properties of both are shown below.

|  | Case 1 | Case 2 |
| --- | --- | --- |
| Actual rubber level (%)* | 18.1 | 18.8 |
| Gel level (%) | 29.4 | 31.6 |
| Swelling index | 12.5 | 12.1 |
| Melt flow index** | 4.96 | 4.98 |
| Impact strength*** Izod @ room temperature, KJ/m$^2$ | 10.6 | 14.5 |
| @ −20° C., KJ/m$^2$ | 7.32 | 8.01 |
| Tensile modulus, GPa | 1.57 | 1.59 |
| Tensile yield psi | 3240 | 3281 |
| Elongation (%) | 141 | 150 |

*determined by NMR
**MFI determined in accordance with ASTM D-1238 under the conditions of 220° C. and 10 kg.
***The Izod impact strength is determined in accordance with ASTM D-256-56.

4. In experimental runs of the inventive process, the crumb was added at the indicated stages of the CM process. In all the indicated runs the added crumb was of the type referred to above as Sample 3 (a mixture of 1:1 of particle sizes 280 and 400 nm, having morphology of core/shell and rubber content of 58%).

| Run | composition | point of crumb addition[a] |
| --- | --- | --- |
| 1 | 100% CM rubber | none |
| 2 | 90% CM rubber/10% crumb rubber[b] | 1 |
| 3 | 90% CM rubber/10% crumb rubber[c] | 2 |
| 4 | 90% CM rubber/10% crumb rubber[d] | 3 |

[a]1-refers to addition of the crumb to the melt line before devolatilization 2-refers to adding the crumb to a subsequent reactor 3-refers to adding the crumb to the first reactor as a second feed.
[b]the crumb was fed as a mixture of 10% crumb and 90% MEK
[c]the crumb was fed as a mixture of 8.4% crumb, 16.3% MEK, and 54.2% styrene, 18.0% acrylonitrile and 3.1% corn oil.
[d]the crumb was fed as a mixture of 13% crumb, 55% MEK and 32% acrylonitrile.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a blend of ABS polymers having a bimodal or multimodal size distribution comprising introducing an emulsion-polymerization-produced core/shell grafted ABS rubber in the form of powder to at least one of the stages of the continuous mass polymerization process for making an ABS polymer, said stages including, in sequence, (i) charging a material system that contains monoalkenyl-aromatic monomer, an ethylenically unsaturated nitrile monomer, and dissolved diene rubber, into a first reactor under conditions calculated to promote at least partial polymerization to form a partially polymerized first mixture and (ii) polymerizing said first mixture in a subsequent reactor to form a subsequent mixture and (iii) devolatilizing said subsequent mixture, said size distribution referring to the rubber particles in said blend, said ABS polymer having a grafted phase and a graft base.

2. The process of claim 1 wherein the material system contains soluble diene rubber in an amount of 5 to 20% relative to the weight of the system.

3. The process of claim 1 wherein the conditions are calculated to convert 10 to 40% of the monomers.

4. The process of claim 1 wherein the diene rubber is in the form of particles having a weight average particle size of 0.2 to 10 microns.

5. The process of claim 1 wherein the subsequent mixture is polymerized to reach a conversion of about 40 to 80%.

6. The process of claim 1 wherein the monoalkenylaromatic monomer is at least one member selected from the group consisting of styrene, alpha-methylstyrene, alpha-ethylstyrene, alpha-methylvinyl-toluene, vinyl toluene, o-ethylstyrene, p-ethylstyrene, 2,4-dimethylstyrene, o-chlorostyrene, p-chlorostyrene, o-bromostyrene, 2,4-dichlorostyrene, 2-chloro-4-methylstyrene and 2,6-dichloro-4-methylstyrene.

7. The process of claim 1 wherein the ethylenically unsaturated nitrile is at least one member selected from the group consisting of acrylonitrile, methacrylonitrile and ethacrylonitrile.

8. The process of claim 1 wherein the material system contains at least 20 percent by weight of the monoalkenylaromatic monomer and at least 5 percent by weight of the unsaturated nitrile.

9. The process of claim 1 wherein the material system contains at least 50 percent by weight of the monoalkenylaromatic monomer and at least 10 percent by weight of the unsaturated nitrile.

10. The process of claim 1 wherein the material system contains 20 to 95 percent by weight of vinylidene aromatic hydrocarbon and 80 to 5 percent by weight of unsaturated nitrile.

11. The process of claim 1 wherein the material system contains 60 to 85 percent by weight of vinylidene aromatic hydrocarbon and 40 to 15 percent by weight of unsaturated nitrile.

12. The process of claim 1 wherein the core/shell grafted ABS rubber has a core of crosslinked diene rubber having a weight average particle size of 0.15 to 0.6 micron.

13. The process of claim 1 wherein the core/shell grafted ABS rubber has a shell comprising poly(styrene-co-acrylonitrile).

14. The process of claim 1 wherein the core/shell grafted ABS rubber is grafted with about 0.3 to 1 part of a grafted phase polymerized from a monomer mixture containing 20–30% by weight of unsaturated nitrites and 70–80% by weight of monoalkenylaromatic monomer" per 1 part of core/shell rubber substrate.

15. The process of claim 1 wherein the dissolved diene rubber consists essentially of 75 to 100 percent by weight of butadiene and/or isoprene and up to 25 percent by weight of at least one monomer selected from the group consisting of monovinylidene aromatic hydrocarbon and unsaturated nitrile.

16. The process of claim 1 wherein the dissolved diene rubber consists essentially of 90 to 95 percent by weight of butadiene and/or isoprene and 5 to 10 percent by weight of at least one monomer selected from the group consisting of monovinylidene aromatic hydrocarbon and unsaturated nitrile.

17. The process of claim 1 wherein the ABS polymer contains 10 to 250 parts by weight of said grafted phase per 100 parts of graft base.

18. The process of claim 1 wherein the ABS polymer contains 20 to 200 parts by weight of said grafted phase per 100 parts of graft base.

19. The process of claim 1 wherein the ABS polymer contains 30 to 150 parts by weight of said grafted phase per 100 parts of graft base.

20. The process of claim 1 wherein the diene rubber is in the form of particles having a weight average particle size of 0.4 to 5 microns.

21. The process of claim 1 wherein the emulsion-polymerization-produced core/shell grafted ABS rubber is introduced in an amount of 1 to 50% relative to the weight of the rubber in the blend.

22. The process of claim 1 wherein the emulsion-polymerization-produced core/shell grafted ABS rubber is introduced in an amount of 5 to 25% relative to the weight of the rubber in the blend.

23. The process of claim 1 wherein the core of the core/shell grafted ABS rubber comprises crosslinked diene rubber having a weight average particle size of 0.15 to 0.6 microns.

24. The process of claim 23 wherein particle size is 0.3 to 0.5 microns.

25. The process of claim 1 wherein the shell enveloping the core comprise poly(styrene-co-acrylonitrile).

26. The process of claim 1 wherein the core/shell substrate is grafted with 0.3 to 1 parts of the polymerized mixture of 20–30% of unsaturated nitrites and 70–80% of monoalkenylaromatic monomer per 1 part of core/shell substrate.

27. The blend of ABS polymers prepared by the process of claim 1.

28. A process of making a blend comprising introducing (a) an emulsion polymerization-produced core/shell grafted ABS rubber powder in the form of a stable dispersion to at least one of the stages of the continuous mass polymerization process for making (b) an ABS polymer having a grafted phase and rubber as graft base, said stages including, in sequence, (i) charging a material system that contains monoalkenyl-aromatic monomer, an ethylenically unsaturated nitrile monomer, and dissolved diene rubber, into a first reactor under conditions calculated to promote at least partial polymerization to form a partially polymerized first mixture and (ii) polymerizing said first mixture in a subsequent reactor to form a subsequent mixture and (iii) devolatilizing said subsequent mixture, to form a blend of (a) and (b), said blend characterized in having a bimodal or multimodal size distribution of the rubber particles.

29. The process of claim 28 wherein the diene rubber is in the form of particles having a weight average particle size of 0.2 to 10 microns.

30. The process of claim 28 wherein the monoalkenylaromatic monomer is at least one member selected from the group consisting of styrene, alpha-methylstyrene, alpha-ethylstyrene, alpha-methylvinyl-toluene, vinyl toluene, o-ethylstyrene, p-ethylstyrene, 2,4-dimethylstyrene, o-chlorostyrene, p-chlorostyrene, o-bromostyrene, 2,4-dichlorostyrene, 2-chloro-4-methylstyrene and 2,6-dichloro-4-methylstyrene.

31. The process of claim 28 wherein the ethylenically unsaturated nitrile is at least one member selected from the group consisting of acrylonitrile, methacrylonitrile and ethacrylonitrile.

32. The process of claim 28 wherein the core/shell grafted ABS rubber has a core of crosslinked diene rubber having a weight average particle size of 0.15 to 0.6 micron.

33. The process of claim 28 wherein the diene rubber is in the form of particles having a weight average particle size of 0.4 to 5 microns.

34. The process of claim 28 wherein the core of the core/shell grafted ABS rubber comprises crosslinked diene rubber having a weight average particle size of 0.15 to 0.6 microns.

35. The blend of ABS polymers prepared by the process of claim 28.

\* \* \* \* \*